Figures 1, 2:
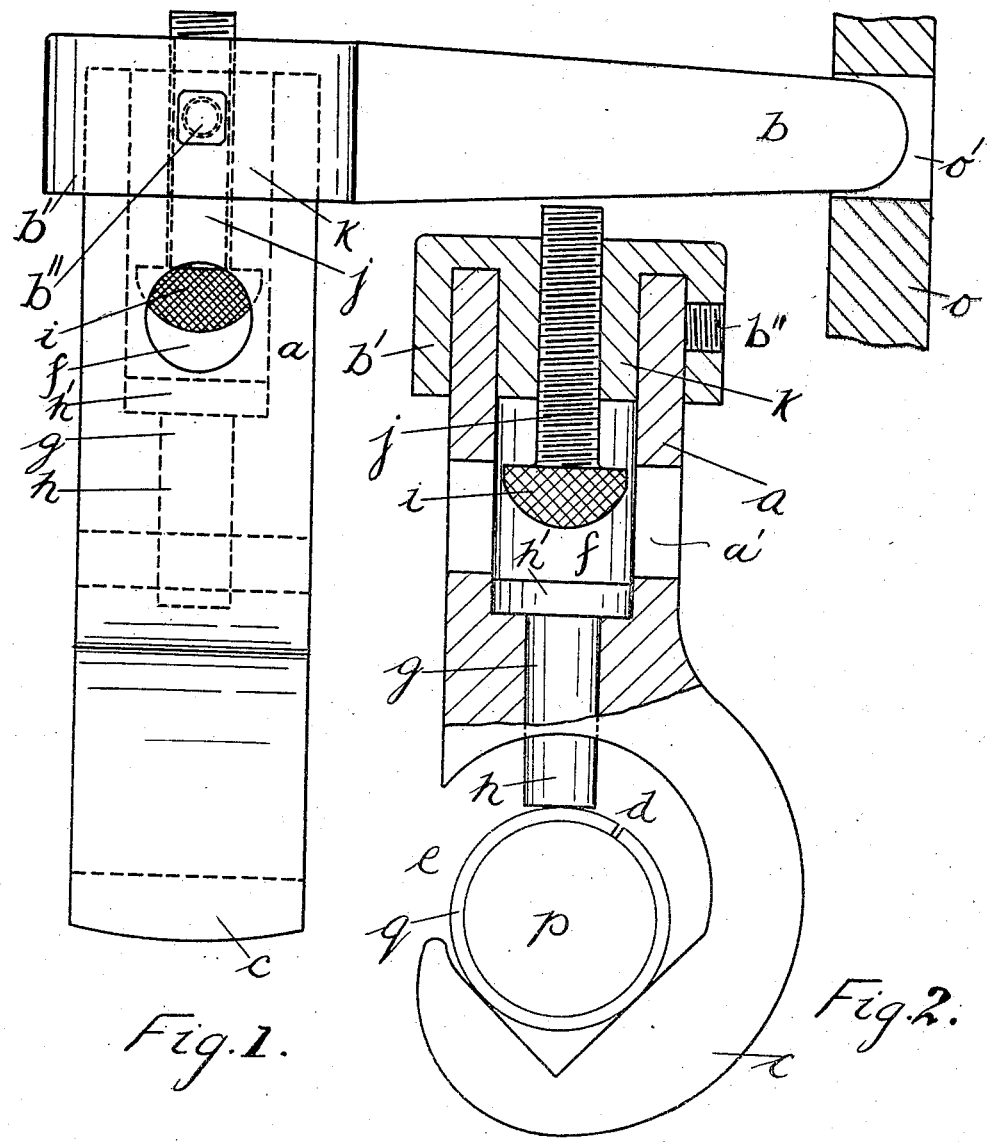

J. M. CROSSWICKS.
LATHE DOG.
APPLICATION FILED APR. 17, 1918.

1,304,663.

Patented May 27, 1919.

UNITED STATES PATENT OFFICE.

JOSEPH MICHAEL CROSSWICKS, OF TORONTO, ONTARIO, CANADA.

LATHE-DOG.

1,304,663. Specification of Letters Patent. Patented May 27, 1919.

Application filed April 17, 1918. Serial No. 229,051.

*To all whom it may concern:*

Be it known that I, JOSEPH MICHAEL CROSSWICKS, a citizen of the United States of America, residing at the city of Toronto, in the county of York and Province of Ontario, Dominion of Canada, have invented certain new and useful Improvements in Lathe-Dogs; and I hereby declare that the following is a full, clear, and exact description of the same.

This invention relates to a lathe dog employed to drive work that is suspended between the lathe centers, the object of the invention being to so construct the lathe dog that the work may be readily secured within it without the employment of tools for that purpose, and without damaging the surface of the finished work; and the invention consists essentially of an arm having at one end an open mouthed jaw with a work seat therein, and at the other end a tail to engage with the face plate of the lathe, the arm having a longitudinal bore which serves as a slideway for a pressure screw, an aperture being provided through the arm from the slideway to the work seat, for the locking pin, by which the work is secured within the jaw when the pressure of the screw is applied to it, as hereinafter set forth and more particularly pointed out in the claims.

In the drawings:—

Figure 1, is a fragmentary section of the face plate and an elevational view of the lathe dog; and, Fig. 2, is a sectional elevational view of the lathe dog taken at right angles to Fig. 1.

Like characters of reference refer to like parts throughout the specification and drawings.

The lathe dog consists of an arm $a$, having at one end a dog-tail $b$ to engage with the face plate $o$ of the lathe, and at the other end an open-mouthed jaw $c$, which is formed with a work seat $d$, into which the work is received through its open mouth $e$.

In the arm $a$ is a longitudinal bore serving as a slideway $f$ for the pressure screw hereinafter described, this slideway extending from the free end of the lever to within a short distance of the work seat, and formed through the lathe dog, from the slideway $f$ to the work seat $d$, is an aperture $g$. Movable through the aperture $g$ is a pin $h$, which extends into the work seat $d$ to engage the work within the jaw, the end of the pin $h$, within the slideway $f$, being provided with a head $h'$, which is engaged by the pressure screw $i$. The pressure screw $i$ is formed with a threaded shank $j$, operating in the screw-threaded bore of a plug $k$, contained in the upper end of the slideway $f$, the head of the pressure screw $i$ being preferably milled, so that it may be manually turned, either to apply or relieve the pressure on the pin $h$. To render the pressure screw $i$ accessible to the operator, the arm $a$ between the plug $k$ and the lower end of the slideway is apertured as shown at $a'$, the dimensions of this aperture being sufficient to permit of the entry of a thumb and finger into the bore.

The use of the lathe dog is similar to that of the carrier drivers now employed in lathe work, the jaw receiving the work, suspended between the lathe centers, and the pin engaging the work when received within the work seat and securely holding it within the jaw when the pressure screw $i$ is adjusted to engage the head of the pin.

As an example of this use, the lathe dog is fitted on the work $p$, which may or may not be provided with a split ring $q$, of brass or copper, which may be bent or closed within certain limits to suit the diameter of the work, the purpose of such ring being to protect the work within the dog, and to receive the pressure of the pin.

When the lathe dog is properly positioned upon the work and the tail $b$ is engaged in one of the slots $o'$ of the face plate $o$, the pressure screw $i$ is adjusted until it engages and tightly presses the pin to lock the work within the jaw.

The revolution of the face plate then causes the united revolution of the lathe dog and the work.

The tail $b$ is provided with a hub $b'$, which embraces the upper end of the arm $a$, and is secured thereto by a set screw $b''$, or other suitable means. Secured to, or integrally formed with, the hub $b'$, is the plug $k$, this plug being preferably of a diameter corresponding to the slideway $f$, to enter the slideway and strengthen the connection between the tail $b$ and the arm $a$ when the parts are assembled.

Other convenient means may be provided within the slideway for the adjustment of the pressure screw, within the scope of the claims, without departing from the essential principle of the invention, which is the utilization of a locking pin and pressure screw to bind the work and lathe dog together.

Having thus fully described the nature of my invention, what I claim as new and desire to secure by Letters Patent, is:—

1. A lathe dog comprising an arm having a longitudinal slideway therein, a tail at one end of the arm, and an open-mouthed jaw at the other end, said jaw having a work seat to receive the work therein, the lathe dog being apertured from the work seat to the adjacent end of the slideway, a pin movable through said aperture, and a pressure screw adjustable in the slideway to engage said pin.

2. A lathe dog comprising an arm having a longitudinal slideway therein, a tail at one end of the arm, and an open-mouthed jaw at the other end, said jaw having a work seat to receive the work therein, the lathe dog being apertured from the work seat to the adjacent end of the slideway, a pin movable through said aperture, a pressure screw adjustable in the slideway to engage said pin, and means within the slideway, having a screw-threaded bore for the pressure screw.

Toronto, March 27th, 1918.

JOSEPH MICHAEL CROSSWICKS.

Signed in the presence of:—
EDWARD S. BERNSTEIN,
CHAS. H. RICHES.

Copies of this patent may be obtained for five cents each, by addressing the "Commissioner of Patents, Washington, D. C."